United States Patent [19]
Arnblock

[11] 3,921,372
[45] Nov. 25, 1975

[54] GRASS-CUTTING DEVICE

[75] Inventor: Lennart Oswald Arnblock, Vellinge, Sweden

[73] Assignee: Flymo Societe Anonyme, Zug, Switzerland

[22] Filed: Mar. 14, 1974

[21] Appl. No.: 451,110

[30] Foreign Application Priority Data
Mar. 27, 1973 United Kingdom............... 14595/73

[52] U.S. Cl................................. 56/12.8; 180/19 R
[51] Int. Cl.².......................................... A01D 53/00
[58] Field of Search............... 56/DIG. 3, 17.5, 16.7, 56/13.5, 12.8, 15.8, 15.9, 16.2, 11.6; 180/19 R, 19 S, 19 H, 54 A, 54 D

[56] References Cited
UNITED STATES PATENTS
| | | | |
|---|---|---|---|
| 3,009,305 | 11/1961 | Cizek | 56/11.6 |
| 3,452,523 | 7/1969 | Svensson | 56/12.8 |
| 3,589,113 | 6/1971 | Svensson | 56/12.8 |

Primary Examiner—Russell R. Kinsey
Attorney, Agent, or Firm—Laurence R. Brown

[57] ABSTRACT

A grass cutting device self-propelled by a drive unit is provided with an extending air cushion supported cutter blade housing affixed thereto and provided with a flexible mount permitting the housing to move about two perpendicular axes to thereby follow contours of the ground surface while supported by an air cushion.

1 Claim, 3 Drawing Figures

GRASS-CUTTING DEVICE

This invention relates to a grass-cutting device of the kind (herein called "the kind defined") comprising a self-propelling unit supported on two wheels mounted for rotation around a common axis and supporting a frame carrying a power source and provided with rigidly connected rearwardly extending handle-bars and forwardly extending supporting means for a cutter unit comprising a housing accommodating at least one cutter. The rigid connection of the handle-bars to the frame may be such as to allow adjustment, and the cutter or cutters may be of the rotary scythe type.

Hitherto it has been common practice to support the cutter unit of a device of the kind defined by one or more caster wheels, but such an arrangement is often unsatisfactory. If the caster wheels are of small size they cause difficulty on uneven ground, and if they are made of larger size they will impede the operation of the device near obstacles on or adjacent to the lawn. It is well known that air-cushion supported lawn mowers have greater manoeuvrability than wheel-supported lawn mowers, and some combinations of wheels and air-cushions have been proposed. Larger grass cutting devices should preferably have a power source carried by the wheels which are used for propelling the devices. In known devices of the kind defined the power transmission to the cutter unit — in most cases a chain, a belt or a shaft — necessitates a rigid connection between the cutter unit and the chassis of the grass cutting device. However, when the housing of the cutter unit is rigidly connected to the chassis any tilting of the grass-cutting device around the axis of the supporting wheels — caused for example by uneven ground — will cause parts of the housing to increase their distance from the ground. Such an effect — called "yawning" or "gaping" — will result in a heavy loss of air and of supporting effect of the air-cushion.

One object of the present invention is to provide a grass cutting device of the kind defined which will offer an improved manoeuvrability without the use of caster wheels.

According to the invention there is provided a grass-cutting device of the kind defined herein, characterised in that when the device is in operation the said cutter unit is supported on a cushion of air and that the housing of said cutter unit is connected to said frame through means allowing tilting of the cutter unit around a substantially horizontally-extending first axis and a substantially horizontally-extending second axis perpendicular to said first axis, the said first axis and the said second axis both extending above the centre of the housing of said cutter unit.

How the invention may be put into practice is described with reference to the accompanying drawing in which.

Figure 1A:
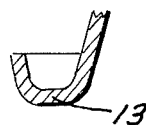
FIG. 1a shows an enlarged cross-sectional view of the rim of the housing.

The illustrated device includes a rigid frame 1 of a self-propelled unit supported on a pair of wheels 2 journalled for rotation around a common axis 3. The said unit is provided with a pair of rigidly connected handle-bars 4 extending rearwardly, and with a supporting shaft 5 extending forwardly relativie to the self-propelled unit. The supporting shaft 5 is journalled in the frame 1 so that the shaft 5 can rotate to a limited extent around its own longitudinal axis relative to said frame 1. The shaft 5 carries a beam 6 supporting two brackets 7 carrying a housing 8. The connection between the beam 6 and the brackets 7 allows the housing 8 to swing relative to the beam 6 around an axis perpendicular to that of the shaft 5.

The frame 1 carries a power source 9 connected by a belt 10 to two pulleys 11 each mounted on a respective shaft 12 journalled one in each bracket 7. The housing 8 terminates downwardly in a rim 13 and contains two sets each comprising a blower wheel 14 and a cutter 15 driven by the respective shaft 12.

Figure 1:
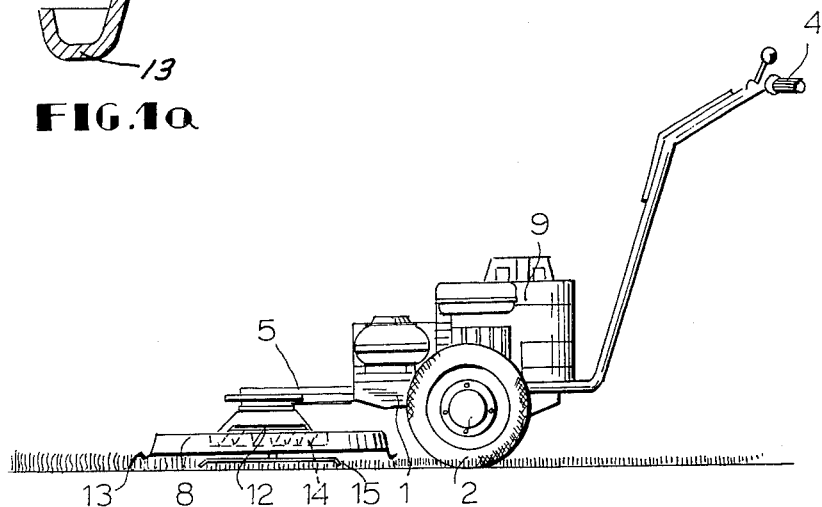
FIG. 1 is a diagrammatic side view of a device according to the invention partly in vertical section.
Figure 2:
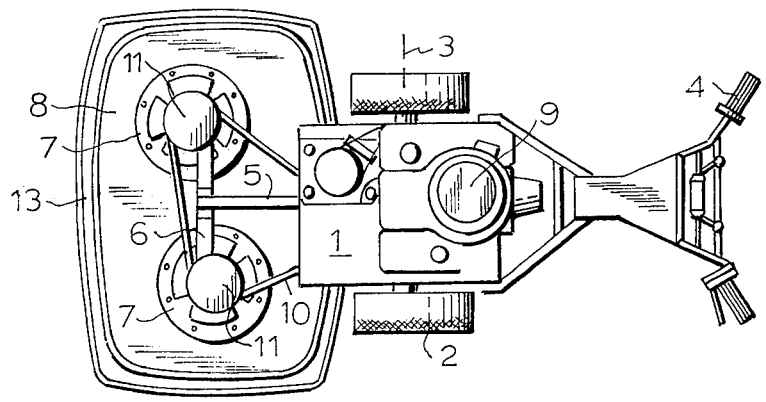
FIG. 2 is a view from above of the device shown in FIG. 1.

The rim 13 has a cross-sectional shape as shown in the encircled detail to an enlarged scale in FIG. 1.

During operation of the device the housing 8 will follow the ground, and on smooth ground the rim 13 is at a small almost constant distance from the ground all along the length of the rim 13.

If the device is used on uneven ground the housing 8 may tilt relative to the frame 1 and thus avoid undue "yawning" of the rim 13. It will be understood that the belt connection between the power source 9 and the pulleys 11 is such as to allow substantial tilting of the housing 8 relative to the frame 1 without influencing the power transmission adversely and without causing deviations in the reaction forces.

What is claimed is:

1. A grass cutting device having a self-propelled drive unit with a cutter unit having means including a housing operating to support the cutter unit off the ground by an air cushion comprising in combination, cutter mounting means connecting said cutter unit to said drive unit comprising drive means coupled between said two units for powering the cutter from said drive unit and first tilting means including a horizontally extending connecting shaft structure disposed above the cutter unit and journalled to permit rotation of said cutter to a limited extent about the shaft axis thereby allowing tilting of the cutter unit around a substantially horizontally-extending first axis, and mounting means coupling said cutter unit housing to said shaft including a substantially horizontally extending beam carried by said shaft disposed above the housing substantially perpendicular to said shaft and brackets connecting said beam to said cutting unit to swing relative to said beam around an axis perpendicular to that of said shaft thereby comprising further structure allowing tilting of the cutter unit around a substantially horizontally-extending second axis perpendicular to the first axis said cutter mounting means being disposed to permit said housing to ride on the ground supported therefrom by said air cushion and having a continuous freedom of movement over a limited degree of rotation about said two axes to conform with irregularities of ground surface.

* * * * *